(12) United States Patent
Lee et al.

(10) Patent No.: US 10,997,962 B2
(45) Date of Patent: May 4, 2021

(54) APPARATUS AND METHOD FOR SYNTHESIZING ENGINE SOUND

(71) Applicant: LG ELECTRONICS INC., Seoul (KR)

(72) Inventors: Kyuho Lee, Seoul (KR); Youngman Kim, Seoul (KR); Sangjun Oh, Seoul (KR); Jaewoong Jeong, Seoul (KR); Seunghyun Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/561,707

(22) Filed: Sep. 5, 2019

(65) Prior Publication Data

US 2019/0392811 A1 Dec. 26, 2019

(30) Foreign Application Priority Data

Aug. 26, 2019 (KR) .................. 10-2019-0104634

(51) Int. Cl.
| | | |
|---|---|---|
| *G10K 15/02* | (2006.01) | |
| *G10L 25/51* | (2013.01) | |
| *G06F 3/16* | (2006.01) | |
| *H04R 3/00* | (2006.01) | |
| *H04R 29/00* | (2006.01) | |
| *G06N 3/08* | (2006.01) | |
| *H04R 1/02* | (2006.01) | |

(52) U.S. Cl.
CPC ............ *G10K 15/02* (2013.01); *G06F 3/165* (2013.01); *G06N 3/08* (2013.01); *G10L 25/51* (2013.01); *H04R 1/025* (2013.01); *H04R 3/00* (2013.01); *H04R 29/001* (2013.01); *H04R 2499/13* (2013.01)

(58) Field of Classification Search
CPC ..... G10K 11/17823; G10K 2210/1282; H04R 3/002; H04R 2499/13
USPC .......................... 381/71.1–71.8, 56, 86, 124
See application file for complete search history.

(56) References Cited

U.S. PATENT DOCUMENTS

| | | | |
|---|---|---|---|
| 6,493,689 B2 * | 12/2002 | Kotoulas .............. | G10K 11/178 |
| | | | 706/23 |
| 2003/0103632 A1 * | 6/2003 | Goubran ................ | H04K 3/825 |
| | | | 381/73.1 |
| 2003/0219133 A1 * | 11/2003 | Horrall .................... | H04R 3/12 |
| | | | 381/73.1 |

(Continued)

FOREIGN PATENT DOCUMENTS

| | | |
|---|---|---|
| JP | 4790876 B1 | 10/2011 |
| JP | 2015-99365 A | 5/2015 |

(Continued)

*Primary Examiner* — William A Jerez Lora
(74) *Attorney, Agent, or Firm* — Birch, Stewart, Kolasch & Birch, LLP (57) ABSTRACT

A method for synthesizing an engine sound includes outputting a first synthesized engine sound, obtaining a change in a first surrounding noise environment, learning an artificial neural network to obtain first masking level information corresponding to the obtained change in the first surrounding noise environment, generating a second synthesized engine sound by correcting the first synthesized engine sound based on the obtained first masking level information, and outputting the generated second synthesized engine sound.

20 Claims, 5 Drawing Sheets

(56) References Cited

U.S. PATENT DOCUMENTS

| | | | |
|---|---|---|---|
| 2012/0308036 A1* | 12/2012 | Christoph | H03G 9/005 |
| | | | 381/86 |
| 2015/0139442 A1 | 5/2015 | Kreifeldt et al. | |
| 2017/0249955 A1* | 8/2017 | Jiang | G06N 5/04 |
| 2018/0344968 A1* | 12/2018 | Gordon | A61M 21/02 |
| 2019/0061736 A1* | 2/2019 | Wiesbeck | B60K 6/20 |
| 2019/0131948 A1 | 5/2019 | Cho et al. | |
| 2020/0005764 A1 | 1/2020 | Chase | |
| 2020/0265824 A1* | 8/2020 | Kremer | A61B 5/4809 |

FOREIGN PATENT DOCUMENTS

| | | |
|---|---|---|
| KR | 10-1986905 B1 | 6/2019 |
| KR | 10-2019-0096877 A | 8/2019 |
| WO | WO 2012/066685 A1 | 5/2012 |

\* cited by examiner

APPARATUS AND METHOD FOR SYNTHESIZING ENGINE SOUND

CROSS-REFERENCE TO RELATED APPLICATIONS

This application claims priority to Korean Patent Application No. 10-2019-0104634 filed on Aug. 26, 2019 in Korea, the entire contents of which is hereby incorporated by reference in its entirety.

BACKGROUND

The embodiment relates to an apparatus and a method for synthesizing an engine sound.

An electric vehicle causes a lower noise due to motor driving, so it is difficult for a pedestrian on a street to recognize that the electric vehicle approaches the pedestrian. Accordingly, as the electric vehicle outputs a synthesized engine sound, the pedestrian may easily recognize the approach of the electric vehicle to the pedestrian.

Meanwhile, a vehicle having an internal combustion engine is driven as an engine is driven, and some drivers prefer a synthesized sound obtained by processing the engine noise.

Accordingly, recently, technologies have been actively developed to effectively produce and output a synthesized engine sound regardless of the type of a vehicle, such as a vehicle having an internal combustion engine or an electric vehicle.

The conventional synthesized engine sound is produced without considering a surrounding noise environment, and does not cope with the change in the surrounding noise environment. For example, when a window is open during the driving, an external noise is introduced into an interior of a vehicle through the open window, and such external noise interrupts the synthesizing of the engine sound. Accordingly, the driver does not sufficiently feel a synthesized engine sound or does not obtain a synthesized engine sound intended at the initial stage.

SUMMARY

The embodiment is provided to solve the above problems and other problems.

Another object of the embodiment is to provide an apparatus and a method for synthesizing an engine sound based on a surrounding noise environment.

Another object of the embodiment is to provide an apparatus and a method for providing a synthesized engine sound capable of maximizing the preference of the driver by adaptively correcting the synthesized engine sound depending on the surrounding noise environment varying in real time.

In order to accomplish the objects, according to an embodiment, there is provided a method for synthesizing an engine sound, which includes outputting a first synthesized engine sound, obtaining a change in a first surrounding noise environment, learning an artificial neural network (ANN) to obtain first masking level information corresponding to the obtained change in the first surrounding noise environment, generating a second synthesized engine sound by correcting the first synthesized engine sound based on the obtained first masking level information, and outputting the generated second synthesized engine sound.

According to another embodiment, there is provided an apparatus for synthesizing an engine sound, which includes: a speaker to output a synthesized engine sound; a sensor to obtain change in a surrounding noise environment; and a processor. The processor learns an artificial neural network to obtain first masking level information corresponding to the obtained change in the first surrounding noise environment, when the change in the first surrounding noise environment is obtained through the sensor, generates a second synthesized engine sound by correcting the first synthesized engine sound based on the obtained first masking level information; and controls the speaker to output the generated second synthesized engine sound.

As described above, an apparatus and a method for synthesizing an engine sound according to an embodiment have the following effects.

According to at least one of embodiments, the masking level information is obtained corresponding to the change in the surrounding noise environment, based on an AI by considering the change in the surrounding noise environment exerting an influence on the synthesizing of the engine sound, and the synthesized engine sound is corrected based on the obtained masking level information, so it is not necessary to obtain noises spread throughout the whole frequency band of the synthesized engine sound. Accordingly, the computation may be simplified and the correction may be rapidly performed.

According to at least one of embodiments, the synthesized engine sound is corrected by considering the change in the surrounding noise environment, thereby removing noises resulting from the change in the surrounding noise environment in advance. Accordingly, even if the synthesized engine sound is output through the speaker, the driver may hear the engine sound without noise, thereby allowing the driver to feel comfortable and providing an engine sound preferred by the driver.

The additional technical scope of the embodiment will be apparently understood by those skilled in the art based on the following description. However, since various variations and modifications falling in the technical spirit and scope of the embodiment may be apparently understood by those skilled in the art. Accordingly, the detailed description and the specific embodiment such as the preferred embodiment will be interpreted as being provided only for illustrative purpose.

DETAILED DESCRIPTION OF THE EMBODIMENTS

Artificial Intelligence (AI)

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

Robot

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-Driving

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

eXtended Reality (XR)

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

Figure 1:
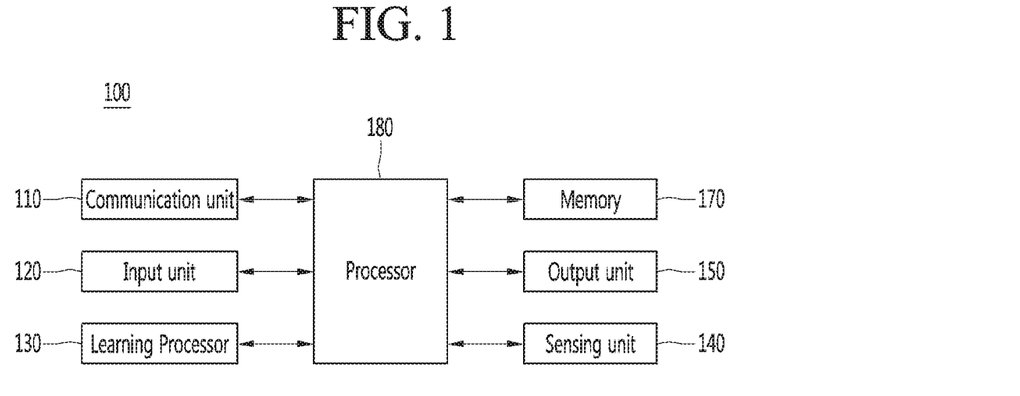
FIG. 1 illustrates an AI device 100 according to an embodiment of the present disclosure.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
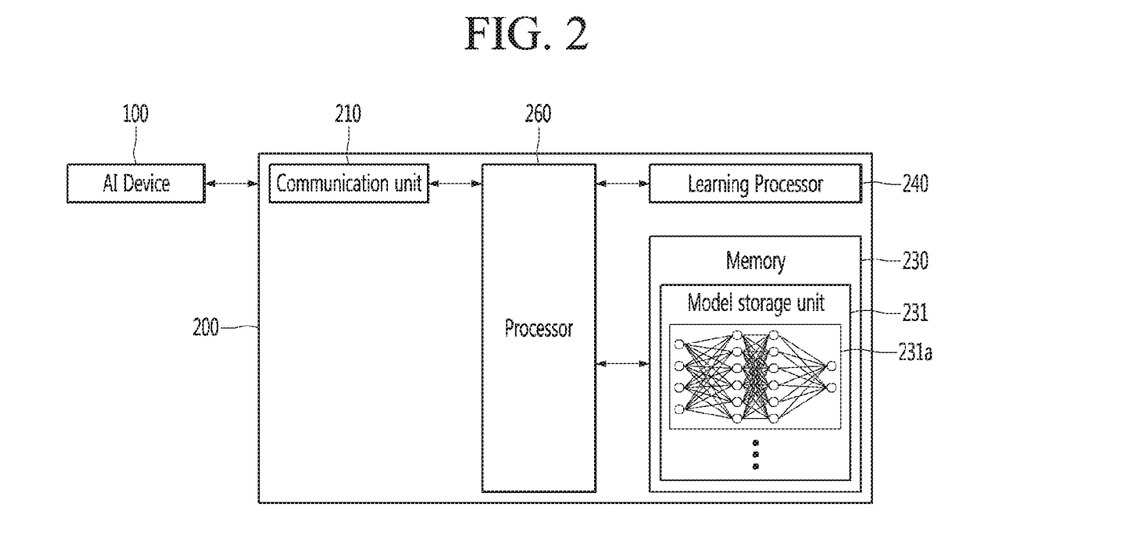
FIG. 2 illustrates an AI server 200 according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
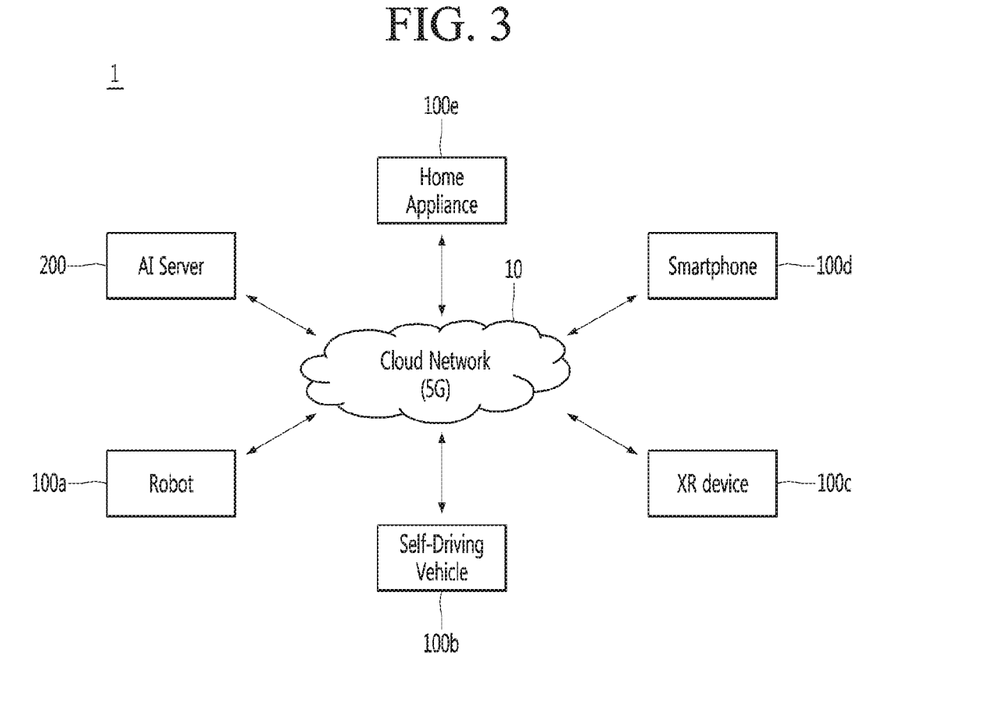
FIG. 3 illustrates an AI system 1 according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

AI+Robot

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

AI+Self-Driving

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

AI+XR

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

AI+Robot+Self-Driving

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

AI+Robot+XR

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

AI+Self-Driving+XR

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
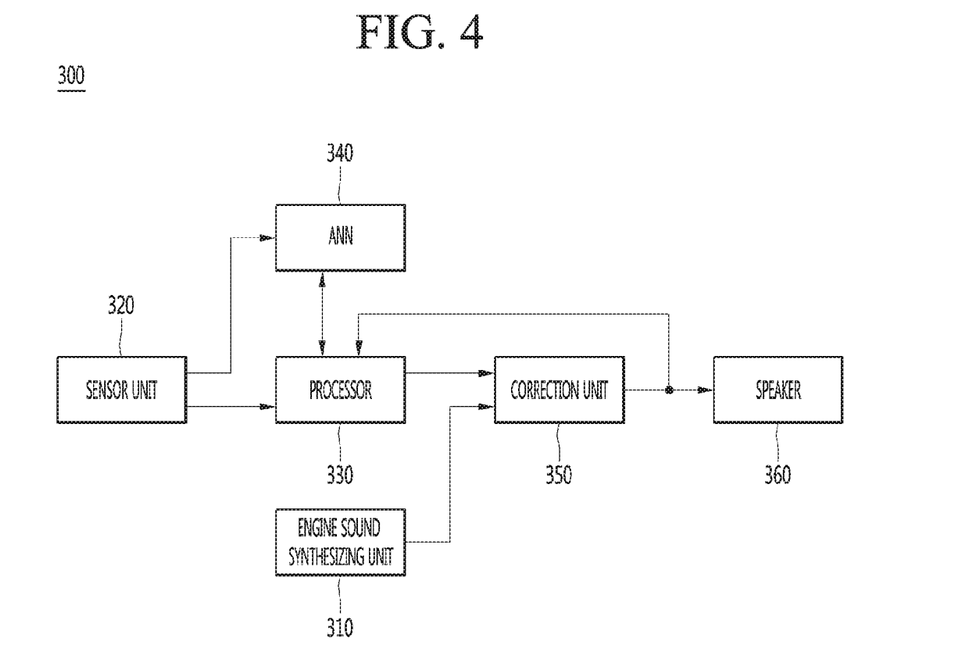
FIG. 4 is a block diagram illustrating an apparatus for synthesizing an engine sound according to an embodiment of the present disclosure.
Figure 5:
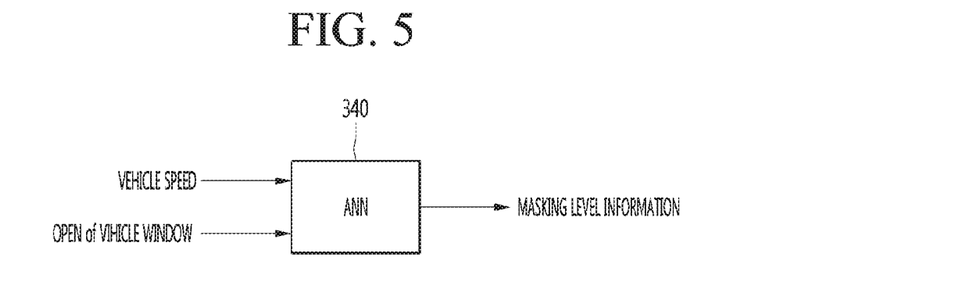
FIG. 5 illustrates an artificial neural network.

FIG. 4 is a block diagram illustrating an apparatus for synthesizing an engine sound according to an embodiment of the present disclosure. FIG. 5 illustrates an artificial neural network.

Referring to FIGS. 1 to 5, according to an embodiment of the present disclosure, an apparatus 300 for synthesizing an engine sound may include an engine sound synthesizer 310, a sensor 320, a processor 330, an artificial neural network (ANN) 340, a correction circuit 350, and a speaker 360. The apparatus 300 for synthesizing an engine sound may include components smaller than or larger than the above-described components in number, and the sensor 320 may be included in the input unit illustrated in FIG. 1. The processor 330 may be the processor 180 illustrated in FIG. 1. The ANN 340 may be stored in the memory illustrated in FIG. 1. The ANN 340 may be implemented with software or hardware. The processor 330 may load the ANN 340 for learning. The ANN 340 may be stored in the memory 230 of the AI server 200 illustrated in FIG. 2. The engine sound synthesizer 310 and the correction circuit 350 may be included the processor 330. The speaker 360 may include an output unit illustrated in FIG. 1.

The engine sound synthesizer 310 may synthesize an engine sound by processing engine noise. The synthesized engine sound may be an engine sound artificially produced. The synthesized engine sound may be similar to or different from an engine sound generated from an engine. The synthesized engine sound may be a sound to cause a driver to be less exhausted as compared to engine noise generated from the engine. In addition, some drivers may prefer such a synthesized engine sound and process the synthesized engine sound in the form of a unique sound.

The processor 330 may control the speaker 360 to output the synthesized engine sound generated from the engine sound synthesizer 310. The speaker 360 may be installed inside the vehicle. The speaker 360 may be installed at an outer portion of the vehicle. The driver may enjoy the engine sound through the synthesized engine sound output through the speaker 360 installed inside the vehicle. It is informed to a pedestrian around the vehicle that the vehicle is approaching the pedestrian through the synthesized engine sound output through the speaker 360 installed at the outer portion of the vehicle.

The synthesized engine sound output through the speaker 360 may be affected by the surrounding noise environment. The surrounding noise environment may include the open of a vehicle window and/or a vehicle speed. The synthesized engine sound may not be heard to the driver due to an external noise as the vehicle speed is increased or the window is open.

According to the present disclosure, when the synthesized engine sound is not heard due to the external noise resulting from the change in the surrounding noise environment, an original synthesized engine sound may be output by removing the relevant external noise.

According to the present disclosure, when the synthesized engine sound is not heard due to external noise resulting from the change in the surrounding noise environment, only a portion of the external noise matched to the synthesized engine sound is removed instead of removing all types of noise. Accordingly, computation may be simplified and the correction may be rapidly performed.

The sensor 320 may collect CAN data. The CAN data, which serves as various pieces of data of a vehicle, may be used to determine the state of the vehicle or to perform the succeeding operations. The CAN data may include an RPM, a vehicle speed, a temperature, or a torque. The CAN data may include a surrounding noise environment. In other words, the CAN data may include a vehicle speed, whether a window is open, or a window open degree. The CAN data may be provided to the processor 330 or the ANN 340.

The processor 330 may determine or obtain whether the surrounding noise environment is changed, based on the CAN data received from the sensor 320. When the surrounding noise environment is changed, the processor 330 may learn the ANN 340 such that the ANN 340 obtains correction information. The correction information may include masking level information.

As illustrated in FIG. 5, the ANN 340 may be learned to obtain the masking level information based on the surrounding noise environment, that is, a vehicle speed and/or the open of a vehicle window, received from the sensor 320.

The CNN data may be learning data previously collected. In this case, the ANN 340, which is learned to obtain the masking level information corresponding to the surrounding noise environment, may be modeled. In this case, the ANN 340 may be referred to as a corrected learning model.

The ANN 340 may learn to obtain the masking level information corresponding to the surrounding noise environment of the CNN data by receiving the CAN data received from the sensor 320. For example, when the CAN data is collected from the sensor 320, the processor 330 may determine whether the surrounding noise environment is changed. If the surrounding noise environment is changed, the processor 330 controls to learn the ANN 340 to obtain the masking level information corresponding to the surrounding noise environment of the CAN data collected from the sensor 320.

The ANN 340 may be learned to obtain the masking level information corresponding to the learning data previously collected. When the ANN 340 is mounted in the apparatus 300 for synthesizing the engine sound, the ANN 340 may be stored in the memory. Thereafter, when the CAN data is collected from the sensor 320 and the surrounding noise environment of the CAN data is changed, the processor 330 may control the ANN 340, which is stored in the memory, to learn the surrounding noise environment such that the ANN 340 obtains the masking level information corresponding to the surrounding noise environment.

The correction circuit 350 may include a correction filter. The correction circuit 350 may correct the synthesized engine sound generated by the engine sound synthesizer 310 based on the masking level information obtained from the ANN 340.

Figure 7:
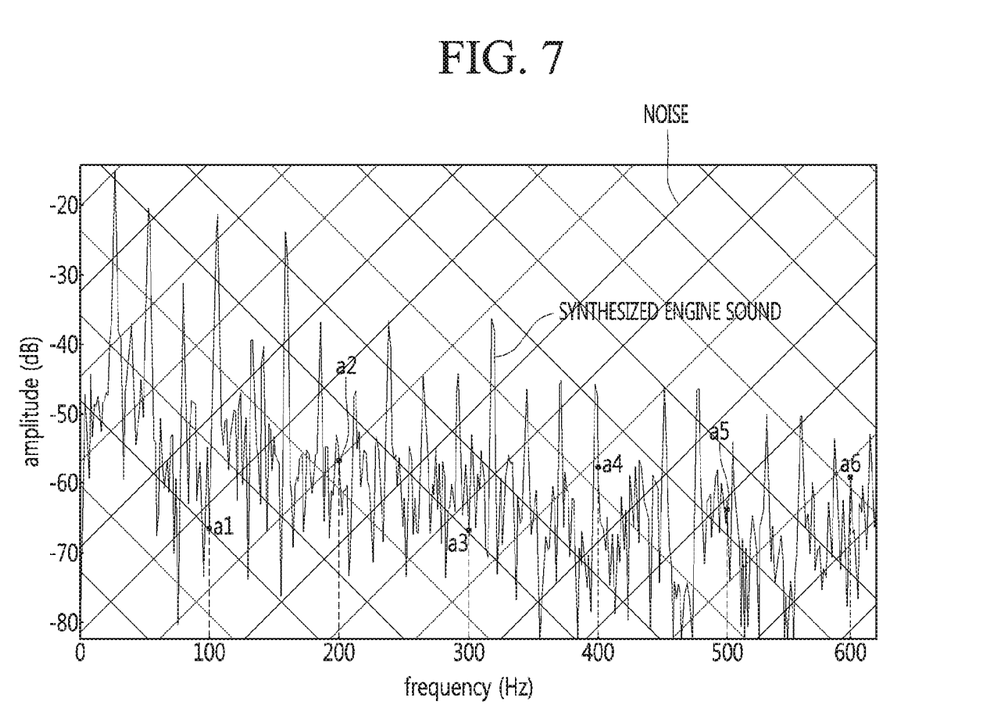
FIG. 7 illustrates the mixture of a synthesized engine sound and an external noise on a frequency domain.

The masking level information may include noise information matched to an amplitude for each sampled frequency of the synthesized engine sound. The noise information may include the intensity of the noise or the density of the noise. As illustrated in FIG. 7, when the surrounding noise environment is changed with respect to the synthesized engine sound, the external noise may be reflected in the synthesized engine sound. Although the synthesized engine sound illustrated in FIG. 7 indicates the synthesized engine sound at the engine speed of, for example, 3000 rpm, various synthesized engine sounds may be generated based on RPMs According to the present disclosure, only a portion, which is matched to the synthesized engine sound, of the noise may be removed by using the masking level information without removing the entire portion of the noise.

As illustrated in FIG. 7, in the synthesized engine sound having the engine speed of 300 rpm, the horizontal axis may represent a frequency, and the vertical axis may represent an amplitude. Depending on frequencies, mutually different synthesized engine sound may be generated.

The external noise is reflected in all amplitudes of all frequency bands. In this case, it is difficult to remove all external noise.

In order to simply solve the above problem, according to the present disclosure, a frequency bin may be used. The frequency bin, which is an interval between samples on the frequency domain, may be value obtained by dividing a frequency band by the number of samples. For example, as illustrated in FIG. 7, the frequency band may be 600 Hz, the number of samples may be 6, and the frequency bin may be 100 Hz. In this case, a sampled frequency may be positioned every 100 Hz. Accordingly, when the sampled frequency is obtained every 100 Hz, the ANN 340 may obtain the masking level information, which includes the amplitude of the synthesized engine sound of each sampled frequency and noise information "a1", "a2", "a3", "a4", "a5", "a6" matched to the amplitude. In FIG. 7, in the masking level information, the first noise information "a1" may be obtained from the first sampled frequency of 100 Hz, and the second noise information "a2" may be obtained from the second sampled frequency of 200 Hz. The third noise information "a3" may be obtained from the third sampled frequency of 300 Hz, and the fourth noise information "a4" may be obtained from the sampled frequency sample of 400 Hz. The fifth noise information "a5" may be obtained from the fifth sampled frequency of 500 Hz, and the sixth noise information "a6" may be obtained from the sixth sampled frequency of 600 Hz.

For example, although FIG. 7 illustrates that the masking level information having information "a1", "a2", "a3", "a4", "a5", and "a6" contained therein at frequencies bines having the interval of 100 Hz, the present disclosure is not limited thereto. As the size of the frequency bin is reduced, more many samples may be obtained and the masking level information having noise information at each sample is obtained, thereby providing a synthesized engine sound having more reduced noise to the driver. Accordingly, the comfortable feeling of the driver may be more increased.

The correction circuit 350 may remove a noise matched to the synthesized engine sound by correcting the synthesized engine sound based on the noise information of the masking level information. As the frequency bin is reduced, more much noise information is obtained, thereby removing the noise associated with the synthesized engine sound as much as possible.

The synthesized engine sound, which is obtained through the correction in the correction circuit 350, may be output through the speaker 360, and the output synthesized engine sound has no noise due to the correction, thereby making a driver feel comfortable and providing a synthesized engine sound that the driver prefers.

Figure 6:
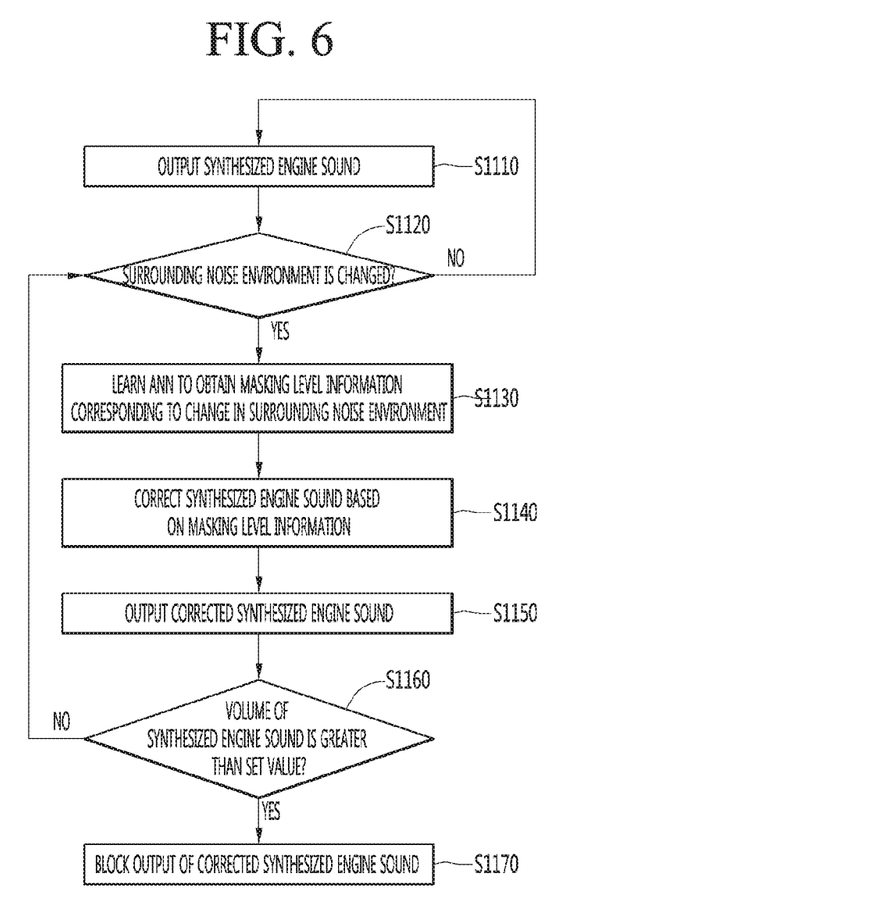
FIG. 6 is a flowchart illustrating a method for synthesizing an engine sound according to an embodiment of the present disclosure.

FIG. 6 is a flowchart illustrating a method for synthesizing an engine sound according to an embodiment of the present disclosure.

Referring to FIGS. 4 and 6, the processor 330 may control to output a synthesized engine sound (S1110).

The synthesized engine sound may be referred to as a first synthesized engine sound. The engine sound synthesizer 310 may generate the first synthesized engine sound. The processor 330 may control the speaker 360 to output the first synthesized engine sound.

The processor 330 may determine or obtain whether a surrounding noise environment is changed (S1120).

The sensor 320 may collect CAN data and may provide the CAN data to the processor 330. The processor 330 may determine or obtain whether the surrounding noise environment is changed, based on the surrounding noise environment of the CAN data.

When the surrounding noise environment is changed, the processor 330 may obtain masking level information corresponding to the change in the surrounding noise environment by learning the ANN 340 (S1130). In this case, the masking level information may be referred to as the first masking level information.

The processor 330 may control the correction circuit 350 to correct the synthesized engine sound based on first masking level information (S1140). The processor 330 may control the speaker 360 to output the corrected synthesized engine sound (S1150). In this case, the corrected synthesized engine sound may be referred to as a second synthesized engine sound.

The processor 330 may obtain whether the volume of the synthesized engine sound is greater than the set value (S1160).

The synthesized engine sound output from the correction circuit 350 may be fedback to the processor 330. The processor 330 may determine or obtain whether the volume of the feedback second synthesized engine sound is greater than the set value. The set value may be the intensity of a volume of information harsh to the ear of the driver. The set value may be again set through the input unit 120 illustrated in FIG. 1.

When the volume of the second synthesized engine sound is greater than the set value, the processor 330 may control the speaker 360 to block the output of the second synthesized engine sound (S1170). For another example, when the volume of the second synthesized engine sound is greater than the set value, the processor 330 may control the correction circuit 350 to block the output of the second synthesized engine sound.

Meanwhile, when the volume of the second synthesized engine sound is less than the set value, the processor 330 may move to step S1120 to determine or obtain whether the surrounding noise environment is changed.

For example, when the surrounding noise environment is changed during the output of the second synthesized engine sound, the processor 330 may learn the ANN 340 to obtain the second masking level information corresponding to the change in the surrounding noise environment.

The surrounding noise environment before the correction to the second synthesized engine sound may be referred to the first surrounding noise environment, and the surrounding noise environment changed during the output of the second synthesized engine sound may be referred to as the second surrounding noise environment. The change in the second surrounding noise environment may be different from the change in the first surrounding noise environment.

For example, when the open degree of the vehicle door is '7' under the second surrounding noise environment while the correction to the second synthesized engine sound is performed and the second synthesized engine sound is output, as the open degree of the vehicle door is '3' under the first surrounding noise environment, the processor 330 may learn the ANN 340 to obtain the second masking level information corresponding to the open degree, which is '7', of the vehicle door and correct the second synthesized engine sound based on the second masking level information to generate a third synthesized engine sound. The third synthesized engine sound may be output through the speaker 360.

According to the present disclosure, the masking level information based on the degree of a noise resulting from the change in the surrounding noise environment may be previously obtained based on an AI technology, and the synthesized engine sound may be corrected by using the obtained masking level information. Even if the corrected synthesized engine sound is output through the speaker, since the synthesized engine sound is corrected based on the change in the surrounding noise environment, the driver may hear an original synthesized engine sound having no noise that may be sensed by the ear of the driver.

According to the present disclosure, when a noise is reflected in the synthesized engine sound output through the speaker 360 due to the change in the surrounding noise environment, the original synthesized engine sound, that is, the synthesized engine sound having no noise is output through the speaker 360 by removing the noise reflected in the synthesized engine sound based on the AI, thereby making a driver feel comfortable and providing a synthesized engine sound that the driver prefers.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A method for synthesizing an engine sound, the method comprising:
   outputting a first synthesized engine sound;
   obtaining a change in a first surrounding noise environment;
   learning an artificial neural network (ANN) to obtain first masking level information corresponding to the obtained change in the first surrounding noise environment;
   generating a second synthesized engine sound by correcting the first synthesized engine sound based on the obtained first masking level information; and
   outputting the generated second synthesized engine sound,
   wherein the first masking level information includes noise information that match amplitudes sampled among a plurality of amplitudes included in a frequency band of the first synthesized engine sound,
   when the first surrounding noise environment changes, an external noise generated by the change in the first surrounding noise environment is included in the first synthesized engine sound,
   wherein the generating of the second synthesized engine sound includes:
   generating the second synthesized engine sound by removing the external noise of the first synthesized engine sound that match the sampled amplitudes based on the noise information.

2. The method of claim 1, wherein the noise information includes:
   an intensity of a noise or a density of the noise.

3. The method of claim 2, wherein the generating of the second synthesized engine sound includes:
outputting the second synthesized engine sound by correcting the first synthesized engine sound such that the second synthesized engine sound has a volume greater than the intensity of the noise.

4. The method of claim 2, herein the generating of the second synthesized engine sound includes:
outputting the second synthesized engine sound by correcting the first synthesized engine sound such that the second synthesized engine sound has a density higher than the density of the noise.

5. The method of claim 1, further comprising:
learning the ANN to obtain second masking level information corresponding to a change in a second surrounding noise environment, when the change in the second surrounding noise environment is obtained during outputting the second synthesized engine sound;
generating a third synthesized engine sound by correcting the second, synthesized engine sound based on the obtained second masking level information; and
outputting the generated third synthesized engine sound.

6. The method of claim 5, wherein each of the change in the first surrounding noise environment and the change in the second surrounding noise environment includes open of chicle window and a vehicle speed.

7. The method of claim 5, further comprising:
controlling to block an output of the third synthesized engine sound, when a volume of the third synthesized engine sound is greater than a set value.

8. An apparatus for synthesizing an engine sound the apparatus comprising:
speaker to output a synthesized engine sound;
a sensor to obtain a change in a surrounding noise environment; and
a processor,
wherein the processor is configured to:
control to output a first synthesized engine sound;
learn an artificial neural network to obtain first masking level information corresponding to the obtained change in the first surrounding noise environment, when a change in a first surrounding noise environment is obtained through the sensor;
generate a second synthesized engine sound by correcting the first synthesized engine sound based on the obtained first masking level information; and
control the speaker to output the generated second synthesized engine sound,
wherein the first masking level information includes noise information that match amplitudes sampled among a plurality of amplitudes included in a frequency band of the first synthesized engine sound,
when the first surrounding noise environment changes, an external noise generated by the change in the first surrounding noise environment is included in the first synthesized engine sound,
wherein the processor is configured to:
generate the second synthesized engine sound by removing the external noise of the first synthesized engine sound that match the sampled amplitudes based on the noise information.

9. The apparatus of claim 8, wherein the noise information includes, an intensity of a noise or a density of the noise.

10. The apparatus of claim 9, wherein the processor is configured to:
output the second synthesized engine sound by correcting the first synthesized engine sound such that the second synthesized engine sound has a volume greater than the intensity of the noise.

11. The apparatus of claim 9, wherein the processor is configured to:
output the second synthesized engine sound by correcting the first synthesized engine sound such that the second synthesized engine sound has a density higher than the density of the noise.

12. The apparatus of claim 8, wherein the processor is configured to:
learn the ANN to obtain second masking level information corresponding to a change in a second surrounding noise environment, when the change in the second in the second surrounding noise environment is obtained during outputting the second synthesized engine sound;
generate a third synthesized engine sound by correcting the second synthesized engine sound based on the obtained second masking level information; and
output the generated third synthesized engine sound.

13. The apparatus of claim 12, wherein each of the change in the first surrounding noise environment and the change in the second surrounding noise environment includes open of a vehicle, window and a vehicle speed.

14. The apparatus of claim 12, wherein the processor is configured to:
control to block an output of the third synthesized engine when a volume of the third synthesized engine sound is greater than a set value.

15. The method of claim 1, wherein the sampled amplitudes are sampled based on a frequency bin which is an interval between the sampled amplitudes on a frequency domain.

16. The method of claim 15, further comprising:
generating the frequency bin based on dividing the frequency band by a number of the sampled amplitudes.

17. The method of claim 1, wherein the masking level information only includes noise information obtained at frequencies corresponding to the sampled amplitudes.

18. The apparatus of claim 8, wherein the sampled amplitudes are sampled based on a frequency bin which is an interval between the sampled amplitudes on a frequency domain.

19. The apparatus of claim 18, herein the processor is configured to:
generate the frequency bin based on dividing the frequency band by a number of the sampled amplitudes.

20. The apparatus of claim 8, wherein the masking level information only includes noise information obtained at frequencies corresponding to the sampled amplitudes.

* * * * *